United States Patent
Zhang et al.

(10) Patent No.: US 12,227,666 B2
(45) Date of Patent: Feb. 18, 2025

(54) 2K CLEARCOAT COMPOSITION, ITS PREPARATION AND USE THEREOF

(71) Applicant: BASF Coatings GmbH, Münster (DE)

(72) Inventors: Yang Zhang, Shanghai (CN); Ji Ming Wang, Shanghai (CN); Lei He, Shanghai (CN); Christian Gerhard Schaefer, Shanghai (CN); Wen Mei Liu, Shanghai (CN); Ranjit Salvi, Shanghai (CN); Stefan Hirsemann, Shanghai (CN)

(73) Assignee: BASF COATINGS GMBH, Muenster (DE)

( * ) Notice: Subject to any disclaimer, the term of this patent is extended or adjusted under 35 U.S.C. 154(b) by 373 days.

(21) Appl. No.: 17/623,504

(22) PCT Filed: Jun. 22, 2020

(86) PCT No.: PCT/EP2020/067286
§ 371 (c)(1),
(2) Date: Dec. 28, 2021

(87) PCT Pub. No.: WO2021/001187
PCT Pub. Date: Jan. 7, 2021

(65) Prior Publication Data
US 2022/0372326 A1    Nov. 24, 2022

(30) Foreign Application Priority Data
Jul. 2, 2019   (WO) ............... PCT/CN2019/094430

(51) Int. Cl.
| | | |
|---|---|---|
| C09D 5/00 | (2006.01) |
| B05D 1/36 | (2006.01) |
| B05D 1/38 | (2006.01) |
| B32B 27/30 | (2006.01) |
| B32B 27/36 | (2006.01) |
| C07F 7/08 | (2006.01) |
| C07F 7/18 | (2006.01) |
| C09D 7/20 | (2018.01) |
| C09D 7/63 | (2018.01) |
| C09D 7/65 | (2018.01) |
| C09D 133/06 | (2006.01) |
| C09D 133/08 | (2006.01) |
| C09D 133/10 | (2006.01) |
| C09D 133/12 | (2006.01) |
| C09D 133/14 | (2006.01) |
| C09D 167/00 | (2006.01) |
| B32B 15/082 | (2006.01) |
| B32B 15/09 | (2006.01) |

(52) U.S. Cl.
CPC .......... C09D 167/00 (2013.01); C07F 7/0812 (2013.01); C07F 7/1804 (2013.01); C09D 7/63 (2018.01); C09D 7/65 (2018.01); C09D 133/14 (2013.01)

(58) Field of Classification Search
CPC ........ C09D 5/00; C09D 7/20; C09D 133/064; C09D 133/066; C09D 133/08; C09D 133/10; C09D 133/12; C09D 197/00; C09D 175/04; C09D 167/00
USPC ......................................................... 525/533
See application file for complete search history.

(56) References Cited

U.S. PATENT DOCUMENTS

| | | | | |
|---|---|---|---|---|
| 4,980,409 A * | 12/1990 | Harakawa | ................ | C09D 5/00 524/510 |
| 5,750,624 A * | 5/1998 | Miyazoe | ............ | C09D 133/064 428/447 |
| 2002/0161121 A1* | 10/2002 | Yoshioka | ........... | C09D 133/064 525/166 |
| 2005/0165145 A1* | 7/2005 | Melchiors | .............. | C09J 133/04 524/556 |
| 2010/0163812 A1* | 7/2010 | Kim | ................... | C08K 5/34922 252/586 |
| 2018/0105717 A1* | 4/2018 | Swarup | ................. | C08F 220/20 |

FOREIGN PATENT DOCUMENTS

| | | |
|---|---|---|
| EP | 0921167 A1 | 6/1999 |
| WO | 2008073645 A1 | 6/2008 |
| WO | 2019110808 A1 | 6/2019 |

OTHER PUBLICATIONS

International Search Report and Written Opinion for corresponding PCT/EP2020/067286 mailed Oct. 5, 2020, 9 Pages.

* cited by examiner

*Primary Examiner* — Michael J Feely
(74) *Attorney, Agent, or Firm* — Armstrong Teasdale LLP

(57) ABSTRACT

Described herein is a 2K clearcoat composition including, Component I including
  a). at least one resin having carboxylic acid groups with acid value of 50 to 400 mg KOH/g;
  b). at least one resin having hydroxyl functional groups with a hydroxyl value of 10 to 800 mg KOH/g;
  c). at least one catalyst; and
  d). at least one solvent, and
Component II including
  e). at least one epoxy-functional alkoxysilane and/or its oligomer and/or its polymer; and
  f). at least one crosslinker reactive to hydroxyl groups.
Also described herein are a substrate coated with the dried and cured 2K clearcoat composition and an automotive including the substrate.

23 Claims, 1 Drawing Sheet

A 2K CLEARCOAT COMPOSITION, ITS PREPARATION AND USE THEREOF
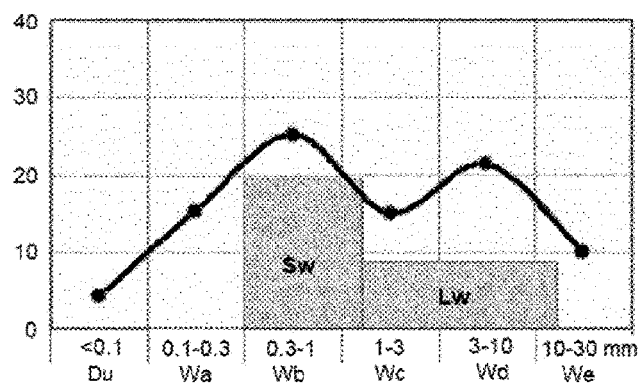

2K CLEARCOAT COMPOSITION, ITS PREPARATION AND USE THEREOF

CROSS-REFERENCE TO RELATED APPLICATIONS

This application is a U.S. National Phase Application of International Patent Application No. PCT/EP2020/067286, filed Jun. 22, 2020, which claims priority to International Patent Application No. PCT/CN2019/094430, filed Jul. 2, 2019, the entire contents of which are hereby incorporated by reference herein.

TECHNICAL FIELD

This invention relates to a clearcoat composition used for automotive and more specifically this invention relates to a 2K clearcoat composition used for automotive, its preparation and use thereof.

BACKGROUND

Automotive coatings are applied in several layers i.e. E-coat, primers or basecoat with primer function, basecoat and clearcoat. After E-coating step, the primer or basecoat with primer function is the first coat to be applied and the basecoat is applied after the primer coat. The clearcoat is a glossy and transparent coating sprayed on top of a basecoat that provides both protective and decorative functions. A clearcoat could be 1K (one-part formulation) or 2K (two-part formulations) system. For 2K system, the clearcoat product is packaged in two barrels and the formulations of two barrels are mixed before applying onto the basecoat. Most 2K systems are based on polyurethane chemistry, which is derived from the use of hydroxyl functional polyacrylate or polyester resin or polyol and isocyanate-based hardeners.

Clearcoat compositions could be either water or organic solvent-borne. Compared to water-borne clearcoat, which has the advantage of low VOC (volatile organic compounds) emission but inferior coating performance such as appearance, mechanical properties, etc. organic solvent-borne clearcoat has the advantage in appearance and general coating performance even though possessing high VOC. Besides, conventional 2K clearcoat possessing good appearance usually has inferior mechanical properties like scratch resistance. To overcome this, the current organic solvent-borne clearcoat introduces inorganic particles such as nano-silica or incorporate silane coupling agent via pre-reaction with standard isocyanate hardener to form an organic-inorganic hybrid system. The incorporation of inorganic particles tends to deteriorate the appearance of the clearcoat due to the incompatibility of the organic and inorganic phases while incorporation of silane into isocyanate hardener requires extra synthetic step which increases process cost.

Hence, it is still required to provide a new clearcoat composition that has good performances in both appearance and mechanical property like scratch-resistance and at the same time possessing relatively low VOC.

SUMMARY OF THE INVENTION

In one aspect, this invention provided a 2K clearcoat composition comprising
Component I comprising
a). at least one resin having carboxylic acid groups with acid value of 50 to 400 mg KOH/g;
b). at least one resin having hydroxyl functional groups with a hydroxyl value of 10 to 800 mg KOH/g
c). at least one catalyst;
d). at least one solvent, and
Component II comprising
e). at least one epoxy-functional alkoxysilane and/or its oligomer and/or its polymer;
f). at least one crosslinker reactive to hydroxyl groups.

In another aspect, this invention provided a substrate coated with a dried and cured 2K clearcoat composition of this invention.

In another aspect, this invention provided an automotive comprising a substrate coated with a dried and cured 2K clearcoat composition of this invention.

In a further aspect, this invention provided a process of coating automotive comprising steps of i) coating of E-coat, ii). coating of a primer or basecoat with primer function, iii). coating of a basecoat onto the layer of primer, and iv). coating of a 2K clearcoat composition of this invention onto the layer of basecoat.

DETAILED DESCRIPTION OF THE DRAWINGS

FIG. 1 is a graph showing the result of BYK wave-scan dual measures at six scale levels differentiated by wavelength (Du, Wa, Wb, Wc, Wd, We).

DETAILED DESCRIPTION OF THE INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the article "2K" refers to a composition comprising two components, each of which may also be a mixture of several compounds. The two components can be blended together if needed. And the two components may also be two independent packages that can be mixed on the spot for applications.

As used herein, the article "acid value" refers to the mass of potassium hydroxide (KOH) in milligrams that is required to neutralize one gram of chemical substance that is a measure of the number of carboxylic acid groups in a chemical compound or in a mixture of compounds.

As used herein, the article "hydroxyl value" refers to the mass of potassium hydroxide (KOH) in milligrams that is required to neutralize the acetic acid taken up on acetylation of one gram of a chemical substance that contains free hydroxyl groups that is a measure of the content of free hydroxyl groups in a chemical substance.

As used herein, the article "resin having carboxylic acid groups" refers to any type of resin including but not limited to polyester, poly(meth)acrylate, poly(meth)acrylate-based copolymer having carboxylic acid groups as side chains or end groups.

As used herein, the article "resin having hydroxyl functional groups" refers to any type of resin including but not limited to polyacrylate, polyester, polyacrylic polyol, polyurethane.

As used herein, the article "epoxy-functional alkoxysilane" refers to any type of alkoxysilane having any type of epoxy or epoxy-based groups.

As used herein, the article "oligomer" refers to a molecular complex of chemicals that consists of a few repeating units in contrast to a polymer consisting of much more repeating units of monomers.

As used herein, the article "free (poly)isocyanate" refers to (poly)isocyanates having at least two free NCO groups for reacting with active hydrogen containing compounds.

As used herein, the article "blocked (poly)isocyanate" refers to (poly)isocyanates that are unable to react until they are exposed to a specific deblocking temperature or agent.

As used herein, the article "alkylated melamine" refers to a molecular complex of chemicals that is derived from a melamine having any type of alkyl group connected to any primary amine of the melamine.

As used herein, the article "carboxylic acid functional polyester" refers to any type of polyester having carboxylic acid as side chains or end groups.

As used herein, the article "poly(meth)acrylate-based copolymer" refers to any type of copolymer having poly(meth)acrylate as a main part including alternating copolymer, random copolymer, block copolymer and graft copolymers.

As used herein, the article "solid content" refers to a proportion of non-volatile material contained in a coating, paint or other suspension that is the material left after the volatile solvent has vaporized.

As used herein, the article "E-coating" refers to an immersion wet paint finishing process that uses electrical current to attract the paint product to a metal surface.

A clearcoat is a transparent layer of paint that is the last coat of paint applied to a substrate. The clearcoat is used to prevent the deterioration from UV radiation, acid rain etc., change the gloss levels and appearance and protect the underneath coating layers. The clearcoat is either organic solvent-borne system or water-borne system but both of two systems have disadvantages. Water-borne system could solve the problem of VOC (volatile organic compounds), however, the performances such as appearance, mechanical properties are not satisfying. Compared with water-borne system, the organic solvent-borne system provides better performances but has the problem of high VOC and therefore the most efficient approach is to reduce VOC in the system i.e. to increase the solid content of the clearcoat compositions.

Based on organic solvent-borne system, the clearcoat in the art shows a good performance in appearance, but the mechanical properties such as scratch resistance is normally not so satisfying after the clearcoat is dried and cured. To improve the mechanical properties such as scratch resistance, the current solution is to add inorganic particles like nanosilica or to incorporate inorganic segment like silane coupling agent into hardeners. However, the added inorganic particles tend to deteriorate the appearance of the clearcoat and incorporating silane coupling agent into hardeners require additional synthesis work that causes extra cost.

This invention is to provide a new type of 2K clearcoat composition that has a higher solid content and therefore a relatively lower VOC and furthermore the obtained clearcoat has a balanced and good performances in appearance and mechanical properties like scratch resistance.

This invention provided a 2K clearcoat composition comprising

Component I comprising
a). at least one resin having carboxylic acid groups with acid value of 50 to 400 mg KOH/g;
b). at least one resin having hydroxyl functional groups with a hydroxyl value of 10 to 800 mg KOH/g;
c). at least one catalyst;
d). at least one solvent, and Component II comprising
e). at least one epoxy-functional alkoxysilane and/or its oligomer and/or its polymer;
f). at least one crosslinker reactive to hydroxyl groups.

Preferably, the resin having carboxyl acid groups in Component I of 2K clearcoat composition has an acid value of from 50 to 400 mg KOH/g and more preferably the resin having carboxyl acid groups is at least one selected from carboxylic acid functional polyester, poly(meth)acrylate, and poly(meth)acrylate-based copolymer. Preferably, the carboxylic acid functional polyester preferably has an acid value of 50 to 400 mg KOH/g, more preferably from 70 to 300 mg KOH/g and even more preferably from 100 to 200 mg KOH/g. Preferably, the carboxylic acid functional polyester has a weight average molecular weight of 500 to 50000 g/mol, more preferably from 1000 to 10000 g/mol and even more preferably from 1500 to 5000 g/mol.

Preferably the carboxylic acid functional polyester is at least one comprising 50% to 95% by weight of monomeric units of carboxylic acid having at least two carboxyl groups and/or its anhydride, 5% to 50% by weight of monomeric units of polyol having at least two hydroxyl groups, 0% to 40% by weight of carboxylic acids having C2 to C12 and 0% to 20% of glycidyl ester having C5 to C12.

Preferably, the poly(meth)acrylate-based copolymer has an acid value of 50 to 400 mg KOH/g, more preferably from 70 to 300 mg KOH/g and even more preferably from 100 to 200 mg KOH/g and a hydroxyl value of 0 to 150 mg KOH/g. Preferably, the poly(meth)acrylate-based copolymer has a weight average molecular weight of 1000 to 50000 g/mol, more preferably from 1000 to 10000 g/mol and even more preferably from 1500 to 5000 g/mol.

Preferably, the poly(meth)acrylate-based copolymer is at least one copolymer comprising 25% to 95% by weight of monomeric units of (meth)acrylate, 5% to 75% by weight of monomeric units of (meth)acrylate acid, 0% to 25% by weight of monomeric units of styrene and 0% to 10% by weight of monomeric units of hydroxyl functional (meth)acrylate, the weight percentage is based on the total weight of poly(meth)acrylate-based copolymer.

Preferably, the poly(meth)acrylate-based copolymer is at least one graft polymer with a backbone comprising 25% to 95% by weight of monomeric units of (meth)acrylate, 5% to 40% by weight of monomeric units of hydroxyl functional (meth)acrylate, 0% to 25% by weight of monomeric units of styrene and 0% to 25% by weight of monomeric units of (meth)acrylate, and a graft part comprising 2% to 25% by weight of monomeric units of cyclic ester of hydroxycarboxylic acids having C4 to C6 and 2% to 25% by weight of monomeric units of carboxylic acid having at least two carboxyl groups and/or its anhydride, the weight percentage is based on the total weight of the graft polymer.

Preferably, the poly(meth)acrylate-based copolymer is at least one graft polymer comprising a backbone having a weight average molecular weight of 1000 to 40000 g/mol and a graft part having a weight average molecular weight of 250 to 60000 g/mol.

Preferably, the poly(meth)acrylate-based copolymer is at least one graft polymer comprising a backbone having an acid value of 0 to 200 mg KOH/g and a hydroxyl value of 25 to 200 mg KOH/g, and a graft part having an acid value of 50 to 400 mg KOH/g and a hydroxyl value of 0 to150 mg KOH/g.

Preferably, the poly(meth)acrylate-based copolymer is at least one graft polymer comprising a backbone having 1% to 40% by weight of monomeric units that provide reactive sites for grafting, the weight percentage is based on the total weight of backbone.

Preferably, the resins having hydroxyl functional groups with a hydroxyl number of 10 to 800 mg KOH/g, more preferably from 60 to 500 mg KOH/g and even more preferably from 80 to 400 mg KOH/g.

Preferably, the resin having hydroxyl functional groups is at least one selected from hydroxyl functional polyacrylate, hydroxyl functional polyester, polyacrylic polyol, hydroxyl functional polyurethane.

Preferably, epoxy-functional alkoxysilane and/or its oligomer is having a structure of Formula I and/or Formula II:

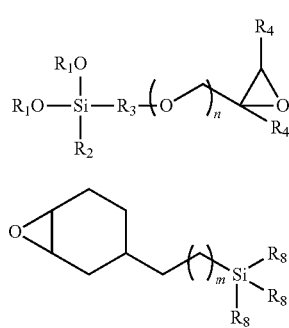

Formula I

Formula II

R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5.

Preferably, the weight average molecular weight of said oligomer of epoxy-functional alkoxysilane is no more than 2000 g/mol.

Preferably, the epoxy functional alkoxysilane polymer is a copolymer having at least one backbone selected from poly(meth)acrylate, polyester, polyurethane, polyether and polyolefin with alkoxysilane and/or epoxy groups end or side groups.

Preferably, the epoxy functional alkoxysilane polymer is a copolymer containing at least 2 alkoxysilane and at least 2 epoxy groups.

Preferably, the epoxy functional alkoxysilane polymer is a copolymer having a weight average molecular weight of from 2000 to 50000 g/mol.

Preferably, the epoxy functional alkoxysilane polymer is a copolymer having an epoxy equivalent of from 250 to 25,000 and an alkoxysilane equivalent of from 250 to 25,000.

Preferably, epoxy-functional alkoxysilane polymer is having a structure of Formula III:

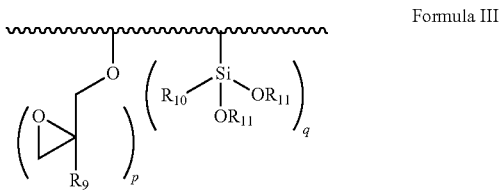

Formula III the wavy line is at least one selected from poly(meth)acrylate, polyester, polyurethane, polyether and polyolefin, R9 is independently hydrogen or alkyl group having C1-C6, R10 is hydroxy or alkyl group having C1-C6 or alkoxy group having C1-C6, R11 is independently hydrogen or alkyl group having C1-C6, p is an integer number from 2 to 350 and q is an integer number from 0 to 350.

Preferably, the crosslinker reactive to hydroxyl groups comprises at least one selected from amino resin, alkylated melamine and free (poly)isocyanate.

Preferably, said amino resin comprises at least one melamine resin and more preferably said melamine resin is having a structure of Formula IV:

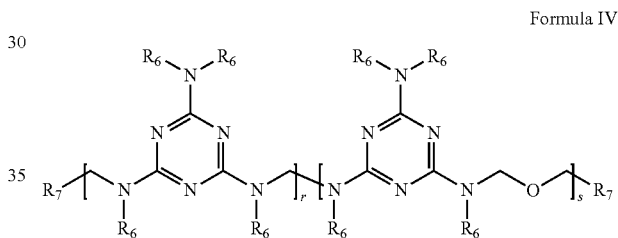

Formula IV

R6 is independently hydrogen, alkylol or alkoxy group having C1-C12, R7 is independently alkoxy group having C1-C12, preferably R6 is hydrogen, —CH2OH or —CH2OR7, preferably R7 is methoxyl or butoxyl group and r, s are integer numbers from 1 to 100.

Preferably, said alkylated melamine is having a structure of Formula V:

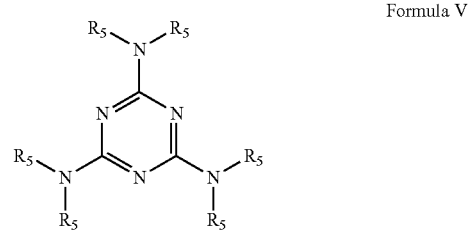

Formula V

R5 is independently hydrogen, alkylol or alkoxy group having C1 to C12.

Preferably the catalyst is at least one selected from monofunctional, difunctional, trifunctional and tetrafunctional carboxylic acid, organic phosphoric acid, organic sulfonic acid, tin-based catalyst, tertiary amine-based catalyst, and quandary amine and more preferably at least one selected from adipic acid, citric acid, p-toluenesulfonic acid (PTSA), dodecyl benzene sulfonic acid (DDBSA), dinoyl naphthalene disulfonic acid (DNNDSA), dinoylnaphthalene sulfonic acid (DNNSA), Dibutyltin dilaurate (DBTDL), dioctyltin dilaurate (DOTL), 1,8-diazabicyclo[5.4.0]undec-7-ene (DBU), dimethyldodecylamine and tetrabutylammonium bromide.

Preferably the solvent is at least one selected from alcohol, esters, ethers, ketones, aromatic compounds, hydrocarbons.

Preferably, the component I or component II of the 2K clearcoat composition further comprises at least one blocked (poly)isocyanate.

Preferably, the component II of the 2K clearcoat composition further comprises at least one epoxy functional resin selected from epoxy functional acrylate copolymer, epoxy functional polyurethane, epoxy functional polyester, epoxy functional polyethylene, epoxy functional polypropylene, bisphenol-A based epoxy resin, bisphenol-F based epoxy resin, novolac epoxy resin, siloxane epoxy resin, glycidylamine epoxy resin, aliphatic epoxy resin and cycloaliphatic epoxy resin.

Preferably, the 2K clearcoat composition further comprises at least one rheology modifier selected from (di)urea crystal, polyamide wax and nanoparticles of polymers, metals and metal oxides.

Preferably, the 2K clearcoat composition further comprises at least one additive selected from leveling agent, deformer, wetting agent, UV absorber, light stabilizer.

Preferably, the weight ratio of Component I and Component II of the 2K clearcoat composition is from 1 to 5 and more preferably from 1.2 to 3.5.

This invention also provided a substrate coated with the dried and cured 2K clearcoat composition of this invention.

This invention also provided an automotive comprising a substrate coated with the dried and cured 2K clearcoat composition of this invention.

Furthermore, this invention provided a process of coating an automotive comprising steps of
i). E-coating,
ii). coating of a primer or basecoat with primer function,
iii). coating of a basecoat onto the layer of primer or basecoat with primer function, and
iv). coating of a 2K clearcoat composition of this invention onto the layer of basecoat.

EMBODIMENTS

The following embodiments are used to illustrate the invention in more detail.

The 1$^{st}$ embodiment is a 2K clearcoat composition comprising
Component I comprising
a). 1% to 60% by weight of at least one resin selected from carboxylic acid functional polyester, poly(meth)acrylate, and poly(meth)acrylate-based copolymer with acid value of 50 to 400 mg KOH/g;
b). 10% to 50% by weight of at least one resin having hydroxyl functional groups with a hydroxyl value of 10 to 800 mg KOH/g;
c). 0.01% to 10% by weight of at least one catalyst;
d). 20% to 60% by weight of at least one solvent, the weight percentage is based on the total weight of Component I, and
Component II comprising
e). 10% to 90% by weight of at least one epoxy-functional alkoxysilane and/or its oligomer and/or its polymer;
f). 10% to 90% by weight of at least one selected from alkylated melamine, melamine resin and free (poly)isocyanate, the weight percentage is based on the total weight of Component II, and
the weight ratio of Component I to Component II is from 1 to 5.

The 2$^{nd}$ embodiment is a 2K clearcoat composition comprising
Component I comprising
a). 1% to 60% by weight of at least one resin selected from carboxylic acid functional polyester, poly(meth)acrylate, and poly(meth)acrylate-based copolymer with acid value of 70 to 300 mg KOH/g;
b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
c). 0.01% to 10% by weight of at least one catalyst;
d). 20% to 60% by weight of at least one solvent, the weight percentage is based on the total weight of Component I, and
Component II comprising
e). 50% to 90% by weight of at least one epoxy-functional alkoxysilane and/or its oligomer and/or its polymer;
f). 10% to 50% by weight of at least one alkylated melamine and/or melamine resin, the weight percentage is based on the total weight of Component II, and
the weight ratio of Component I to Component II is from 1.2 to 3.5.

The 3$^{rd}$ embodiment is a 2K clearcoat composition comprising
Component I comprising
a). 1% to 60% by weight of at least one resin selected from carboxylic acid functional polyester, poly(meth)acrylate, and poly(meth)acrylate-based copolymer with acid value of 50 to 400 mg KOH/g;
b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
c). 0.01% to 10% by weight of at least one catalyst;
d). 20% to 60% by weight of at least one solvent, the weight percentage is based on the total weight of Component I, and
Component II comprising
e). 10% to 90% by weight of at least one epoxy-functional alkoxysilane and/or its oligomer having a structure of Formula I and/or Formula II:

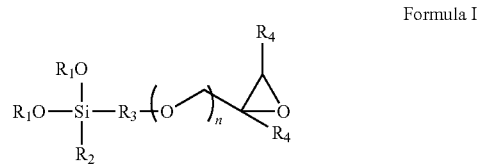

Formula I

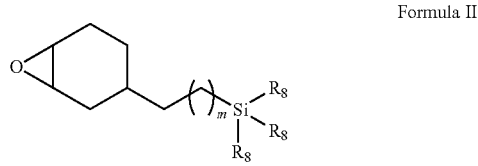

Formula II

R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5;
  f). 10% to 90% by weight of at least one alkylated melamine and/or melamine resin, the weight percentage is based on the total weight of Component II, and
  the weight ratio of Component I to Component II is from 1 to 5.

The 4$^{th}$ embodiment is a 2K clearcoat composition comprising
  Component I comprising
  a). 1% to 60% by weight of at least one resin selected from carboxylic acid functional polyester, poly(meth)acrylate, and poly(meth)acrylate-based copolymer with acid value of 50 to 400 mg KOH/g;
  b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
  c). 0.01% to 10% by weight of at least one catalyst;
  d). 20% to 60% by weight of at least one solvent, the weight percentage is based on the total weight of Component I, and
  Component II comprising
  e). 10% to 90% by weight of at least one epoxy-functional alkoxysilane polymer having a structure of Formula III:

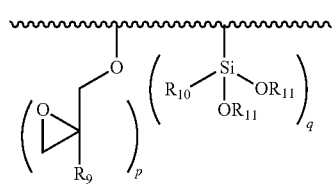

Formula III the wavy line is at least one selected from poly(meth)acrylate, polyester, polyurethane, polyether and polyolefin, R9 is independently hydrogen or alkyl group having C1-C6, R10 is hydroxy or alkyl group having C1-C6 or alkoxy group having C1-C6, R11 is independently hydrogen or alkyl group having C1-C6, p is an integer number from 2 to 350 and q is an integer number from 0 to 350;
  f). 10% to 90% by weight of at least one alkylated melamine and/or melamine resin, the weight percentage is based on the total weight of Component II, and
  the weight ratio of Component I to Component II is from 1 to 5.

The 5$^{th}$ embodiment is a 2K clearcoat composition comprising
  Component I comprising
  a). 1% to 60% by weight of at least one resin having carboxylic acid groups with acid value of 50 to 400 mg KOH/g;
  b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
  c). 0.01% to 10% by weight of at least one catalyst;
  d). 20% to 60% by weight of at least one solvent, the weight percentage is based on the total weight of Component I, and
  Component II comprising
  e). 10% to 90% by weight of at least one epoxy-functional alkoxysilane and/or its oligomer and/or its polymer;
  f). 10% to 90% by weight of at least one melamine resin having a structure of Formula IV:

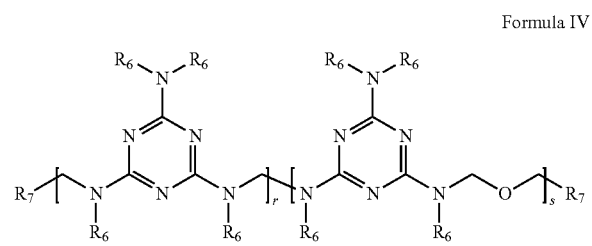

Formula IV

R6 is independently hydrogen, alkylol or alkoxy group having C1-C12, R7 is independently alkoxy group having C1-C12, preferably R6 is hydrogen, —CH2OH or —CH2OR7, preferably R7 is methoxyl or butoxyl group and r, s are integer numbers from 1 to 100;
  the weight percentage is based on the total weight of Component II, and
  the weight ratio of Component I to Component II is from 1 to 5.

The 6$^{th}$ embodiment is a 2K clearcoat composition comprising
  Component I comprising
  a). 1% to 60% by weight of at least one resin having carboxylic acid groups with acid value of 50 to 400 mg KOH/g;
  b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
  c). 0.01% to 10% by weight of at least one catalyst;
  d). 20% to 60% by weight of at least one solvent, the weight percentage is based on the total weight of Component I, and
  Component II comprising
  e). 10% to 90% by weight of at least one epoxy-functional alkoxysilane and/or its oligomer and/or its polymer;
  f). 10% to 90% by weight of at least one alkylated melamine having a structure of Formula V:

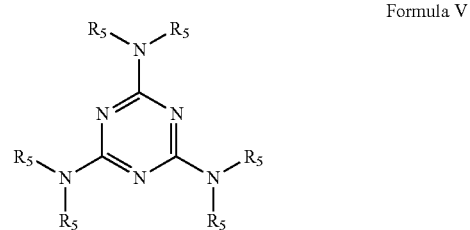

Formula V

R5 is independently hydrogen, alkylol or alkoxy group having C1 to C12;

the weight percentage is based on the total weight of Component II, and the weight ratio of Component I to Component II is from 1 to 5.

The 7$^{th}$ embodiment is a 2K clearcoat composition comprising

Component I comprising a). 1% to 60% by weight of at least one resin selected from carboxylic acid functional polyester, poly(meth)acrylate, and poly(meth)acrylate-based copolymer with acid value of 50 to 400 mg KOH/g;

b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;

c). 0.01% to 10% by weight of at least one catalyst;

d). 20% to 60% by weight of at least one solvent, the weight percentage is based on the total weight of Component I, and Component II comprising e). 10% to 90% by weight of at least one epoxy-functional alkoxysilane and/or its oligomer and/or its polymer having a structure of Formula I and/or Formula II:

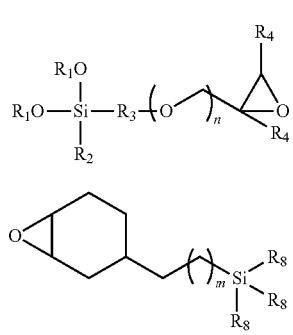

Formula I

Formula II wherein R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5;

f). 10% to 90% by weight of at least one melamine resin having a structure of Formula IV:

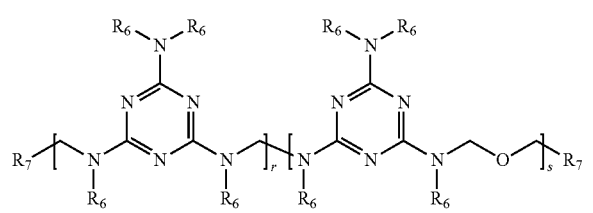

Formula IV wherein R6 is independently hydrogen, alkylol or alkoxy group having C1-C12, R7 is independently alkoxy group having C1-C12, preferably R6 is hydrogen, —CH2OH or —CH2OR7, preferably R7 is methoxyl or butoxyl group and r, s are integer numbers from 1 to 100, the weight percentage is based on the total weight of Component II, and the weight ratio of Component I to Component II is from 1 to 5.

The 8$^{th}$ embodiment is a 2K clearcoat composition comprising

Component I comprising a). 1% to 60% by weight of at least one resin selected from carboxylic acid functional polyester, poly(meth)acrylate, and poly(meth)acrylate-based copolymer with acid value of 50 to 400 mg KOH/g;

b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;

c). 0.01% to 10% by weight of at least one catalyst;

d). 20% to 60% by weight of at least one solvent, the weight percentage is based on the total weight of Component I, and Component II comprising e). 10% to 90% by weight of at least one epoxy-functional alkoxysilane and/or its oligomer having a structure of Formula I and/or Formula II:

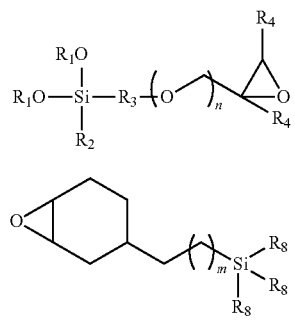

Formula I

Formula II wherein R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5;

f). 10% to 90% by weight of at least one alkylated melamine having a structure of Formula V:

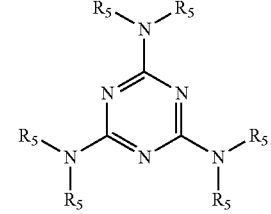

Formula V

R5 is independently hydrogen, alkylol or alkoxy group having C1 to C12, the weight percentage is based on the total weight of Component II, and the weight ratio of Component I to Component II is from 1 to 5.

The 9th embodiment is a 2K clearcoat composition comprising

Component I comprising
- a). 1% to 60% by weight of at least one resin selected from carboxylic acid functional polyester, poly(meth)acrylate, and poly(meth)acrylate-based copolymer with acid value of 50 to 400 mg KOH/g;
- b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
- c). 0.01% to 10% by weight of at least one catalyst selected from adipic acid, citric acid, p-toluenesulfonic acid (PTSA), dodecyl benzene sulfonic acid (DDBSA), dinoyl naphthalene disulfonic acid (DNNDSA), dinoylnaphthalene sulfonic acid (DNNSA), Dibutyltin dilaurate (DBTDL) and dioctyltin dilaurate (DOTL), 1,8-diazabicyclo[5,4,0]undec-7-ene(DBU), dimethyldodecylamine and tetrabutylammonium bromide;
- d). 20% to 60% by weight of at least one solvent selected from alcohol, esters, ethers, ketones, aromatic compounds and hydrocarbons, the weight percentage is based on the total weight of Component I, and Component II comprising
- e). 10% to 90% by weight of at least one epoxy-functional alkoxysilane and/or its oligomer and/or its polymer having a structure of Formula I and/or Formula II and/or Formula III:

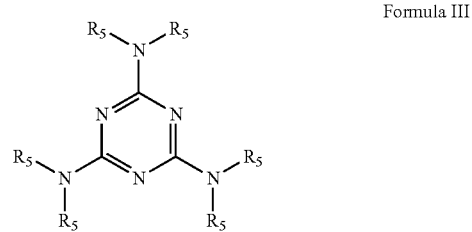

Formula I

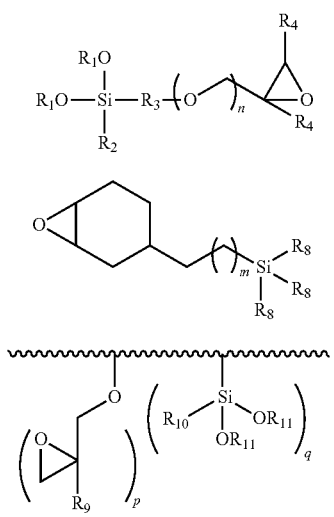

Formula II

Formula III

R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5, the wavy line is at least one selected from poly(meth)acrylate, polyester, polyurethane, polyether and polyolefin, R9 is independently hydrogen or alkyl group having C1-C6, R10 is hydroxy or alkyl group having C1-C6 or alkoxy group having C1-C6, R11 is independently hydrogen or alkyl group having C1-C6, p is an integer number from 2 to 350 and q is an integer numbers from 0 to 350;
- f). 10% to 90% by weight of at least one alkylated melamine having a structure of Formula III:

Formula III

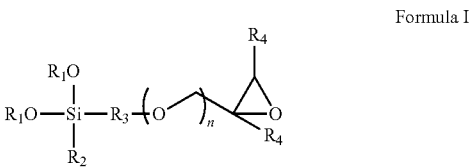

wherein R5 is independently hydrogen, alkylol or alkoxy group having C1 to C12, the weight percentage is based on the total weight of Component II, and the weight ratio of Component I to Component II is from 1 to 5.

The 10th embodiment is a 2K clearcoat composition comprising

Component I comprising
- a). 1% to 60% by weight of at least one resin selected from carboxylic acid functional polyester, poly(meth)acrylate, and poly(meth)acrylate-based copolymer with acid value of 50 to 400 mg KOH/g;
- b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
- c). 0.01% to 10% by weight of at least one catalyst selected from adipic acid, citric acid, p-toluenesulfonic acid (PTSA), dodecyl benzene sulfonic acid (DDBSA), dinoyl naphthalene disulfonic acid (DNNDSA), dinoylnaphthalene sulfonic acid (DNNSA), Dibutyltin dilaurate (DBTDL) and dioctyltin dilaurate (DOTL), 1,8-diazabicyclo[5,4,0]undec-7-ene(DBU), dimethyldodecylamine and tetrabutylammonium bromide;
- d). 20% to 60% by weight of at least one solvent selected from alcohol, esters, ethers, ketones, aromatic compounds and hydrocarbons, the weight percentage is based on the total weight of Component I, and Component II comprising
- e). 10% to 90% by weight of at least one epoxy-functional alkoxysilane and/or its oligomer and/or its polymer having a structure of Formula I and/or Formula II and/or Formula III:

Formula I

-continued

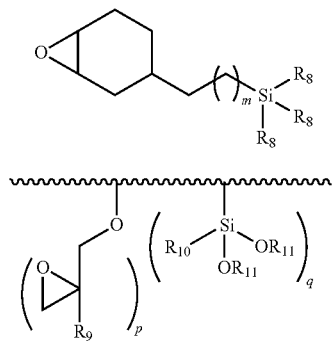

Formula II

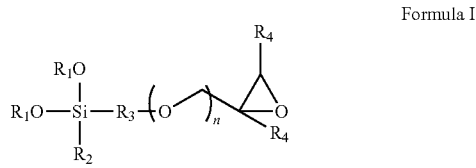

Formula III

R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5, the wavy line is at least one selected from poly(meth)acrylate, polyester, polyurethane, polyether and polyolefin, R9 is independently hydrogen or alkyl group having C1-C6, R10 is hydroxy or alkyl group having C1-C6 or alkoxy group having C1-C6, R11 is independently hydrogen or alkyl group having C1-C6, p is an integer number from 2 to 350 and q is an integer number from 0 to 350;

f). 10% to 90% by weight of at least one melamine resin having a structure of Formula IV:

Formula IV

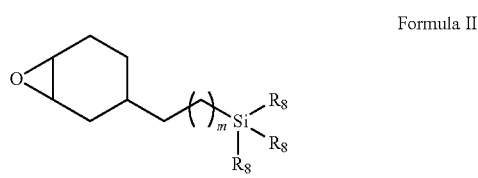

wherein R6 is independently hydrogen, alkylol or alkoxy group having C1-C12, R7 is independently alkoxy group having C1-C12, preferably R6 is hydrogen, —CH2OH or —CH2OR7, preferably R7 is methoxyl or butoxyl group and r, s are integer numbers from 1 to 100, the weight percentage is based on the total weight of Component II, and the weight ratio of Component I to Component II is from 1 to 5.

The 11$^{th}$ embodiment is a 2K clearcoat composition comprising

Component I comprising
a). 1% to 60% by weight of at least one resin selected from carboxylic acid functional polyester, poly(meth)acrylate, and poly(meth)acrylate-based copolymer with acid value of 50 to 400 mg KOH/g;
b). 10% to 50% by weight of at least one resin selected from hydroxyl functional polyacrylate, hydroxyl functional polyester, polyacrylic polyol, hydroxyl functional polyurethane with a hydroxyl value of 10 to 800 mg KOH/g;
c). 0.01% to 10% by weight of at least one catalyst selected from adipic acid, citric acid, p-toluenesulfonic acid (PTSA), dodecyl benzene sulfonic acid (DDBSA), dinoyl naphthalene disulfonic acid (DNNDSA), dinoylnaphthalene sulfonic acid (DNNSA), Dibutyltin dilaurate (DBTDL) and dioctyltin dilaurate (DOTL), 1,8-diazabicyclo[5,4,0]undec-7-ene(DBU), dimethyldodecylamine and tetrabutylammonium bromide;
d). 20% to 60% by weight of at least one solvent selected from alcohol, esters, ethers, ketones, aromatic compounds and hydrocarbons, the weight percentage is based on the total weight of Component I, and Component II comprising
e). 10% to 90% by weight of at least one epoxy-functional alkoxysilane and/or its oligomer and/or its polymer having a structure of Formula I and/or Formula II:

Formula I

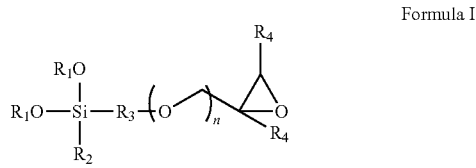

Formula II

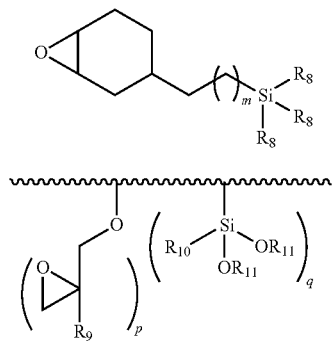

Formula III

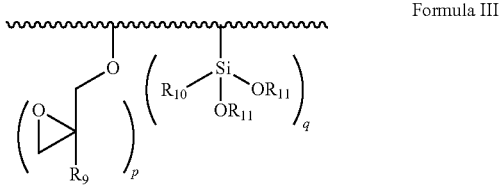

R1 is independently hydrogen or alkyl group having C1-C6, R2 is hydroxy or alkyl group having C1-C6 or alkoxy group having C1-C6, R3 is at least one selected from groups consisting of alkylene, cycloalkylene, heterocyclic, arylene, alkoxylene, aralkylene, alkenylene, cycloalkylene and polymer moiety, R4 is independently hydrogen or alkyl group having C1-C6, R8 is independently hydrogen or alkoxyl group having C1-C6 and at least one is alkoxyl group, n is integer number 0 or 1 and m is integer number from 0 to 5, the wavy line is at least one selected from poly(meth)acrylate, polyester, polyurethane, polyether and polyolefin, R9 is independently hydrogen or alkyl group having C1-C6, R10 is hydroxy or alkyl group having C1-C6 or alkoxy group having C1-C6, R11 is independently hydrogen or alkyl group having C1-C6, p is an integer number from 2 to 350 and q is an integer numbers from 0 to 350;

f). 10% to 90% by weight of at least one melamine resin having a structure of Formula IV and at least one alkylated melamine having a structure of Formula V:

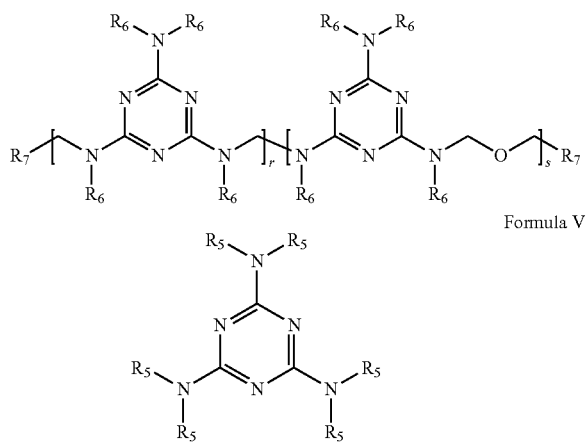

Formula IV

Formula V

R5 is independently hydrogen, alkylol or alkoxy group having C1 to C12, R6 is independently hydrogen, alkylol or alkoxy group having C1-C12, R7 is independently alkoxy group having C1-C12, preferably R6 is hydrogen, —CH2OH or —CH2OR7, preferably R7 is methoxyl or butoxyl group and r, s are integer numbers from 1 to 100, the weight percentage is based on the total weight of Component II, the weight percentage is based on the total weight of Component II, and the weight ratio of Component I to Component II is from 1.2 to 3.5.

The 12$^{th}$ embodiment is a 2K clearcoat composition according to any one of embodiments 1 to 11, of which the component I or component II further comprises at least one blocked (poly)isocyanate.

The 13$^{th}$ embodiment is a 2K clearcoat composition according to any one of embodiments 1 to 12, of which the component II further comprises at least one epoxy functional resin selected from epoxy functional acrylate copolymer, epoxy functional polyurethane, epoxy functional polyester, epoxy functional polyethylene, epoxy functional polypropylene, bisphenol-A based epoxy resin, bisphenol-F based epoxy resin, novolac epoxy resin, siloxane epoxy resin, glycidylamine epoxy resin, aliphatic epoxy resin and cycloaliphatic epoxy resin.

The 14$^{th}$ embodiment is a 2K clearcoat composition according to any one of embodiments 1 to 13, which further comprises at least one rheology modifier selected from (di)urea crystal, polyamide wax and nanoparticles of polymers, metals and metal oxides.

The 15$^{th}$ embodiment is a 2K clearcoat composition according to any one of embodiments 1 to 14, which further comprises at least one additive selected from leveling agent, deformer, wetting agent, UV absorber and light stabilizer.

The 16$^{th}$ embodiment is a substrate coated with the dried and cured 2K clearcoat composition according to any one of embodiments 1 to 15.

The 17$^{th}$ embodiment is an automotive comprising a substrate according to embodiment 16.

The 18$^{th}$ embodiment is a process of coating an automotive comprising steps of i). E-coating, ii). coating of a primer or a basecoat with primer function, iii). coating of a basecoat onto the layer of primer or basecoat with primer function, and iv). coating of a 2K clearcoat composition according to any one of embodiments 1 to 15 onto the layer of basecoat.

EXAMPLES

The present invention will now be described with reference to Examples and Comparative Examples, which are not intended to limit the present invention.

Preparation of Carboxylic Acid Functional Polyester 29.4 parts by weight of hexahydrophthalic anhydride (HHPA), 0.8 parts by weight of cyclohexane (CH), 10.6 parts by weight of dodecanoic acid (DDA) and 13.4 parts by weight of pentaerythritol (Penta) are charged to a stainless-steel reactor equipped with reflux condenser, water separator and N$_2$ inlet. The resulting reaction mixture is heated up to 185° C. under N$_2$. After an acid number of 150 mg KOH/g is reached, the reaction mixture is cooled to 120° C. and the polymer is diluted by the addition of a solution of 10.1 parts by weight of hexahydrophthalic anhydride (HHPA) in 32.1 parts by weight of solvent naphtha 160/180 (SN). The reaction mixture is hold at 120° C. until an acid number of 180 mg KOH/g is reached. Afterwards, the reaction mixture is diluted by 1-butanol (1-Bu) to reach the final solid content of 62%. The resulting polyester possesses a number-average molecular ($M_N$) weight of 1000 g/mol, a weight-average molecular weight ($M_W$) of 3000 g/mol, an OH value of 10 mg KOH/g and an acid value of 181 mg KOH/g.

Preparation of Hydroxyl Functional Polyacrylate

A stainless-steel reactor equipped with reflux condenser and N$_2$ inlet is charged with 26.2 parts by weight of solvent naphtha 160/180 (SN) and this initial charge is heated to 140° C. Thereafter, over a period of 4.75 hours, an initiator solution (1.1 parts by weight of tertiary butylperoxy-2-ethylhexanoate (TBPEH) in 3.8 parts by weight of solvent naphtha 160/180) is metered in at a uniform rate with stirring. The monomer mixture containing 5.7 parts by weight of styrene (St), 17.2 parts by weight of butanediol monoacrylate (BDA), 26.7 parts by weight of 2-ethyl hexylacrylate (EHA), 7.7 parts by weight of 1-hydroxyethyl methacrylate (HEMA) is metered in at a uniform rate with stirring over a period of 4 hours. Afterwards, the reaction mixture is cooled to 60° C. and diluted by the addition of 11.4 parts by weight of solvent naphtha 160/180 (SN). The solid content of the resulting solution of polyacrylate is 58%. The resulting polyacrylate possesses a weight-average molecular weight ($M_W$) of 8300 g/mol and an OH value of 170 mg KOH/g.

Preparation of Hydroxyl Functional Polyester 21.2 parts by weight of hexahydrophthalic anhydride (HHPA), 17.4 parts by weight of isononaic acid (INA), 0.3 parts by weight of cyclohexane (CH), 8.8 parts by weight of ethylbutylpropandiol-1,3 (EBPD), 7.4 parts by weight of trimethylolpropane (TMP) and 9.4 parts by weight of pentaerythritol (Penta) are charged to a stainless-steel reactor equipped with reflux condenser, water separator and N$_2$ inlet. The resulting reaction mixture is heated to 185° C. within 2 hours under N$_2$. After an acid number of 12.5 mg KOH/g is reached, the reaction mixture is cooled to 160° C. and the polymer is diluted by the addition of 35.5 parts by weight of solvent naphtha 160/180 (SN). The solid content of the resulting solution of polyester is 60%. The resulting polyester possesses a weight-average molecular weight (MW) of 3500 g/mol and an OH value of 167 mg KOH/g.

Preparation of Epoxide Functional Polyacrylate

A stainless-steel reactor equipped with reflux condenser and $N_2$ inlet is charged with 24.3 parts by weight of solvent naphtha 160/180 (SN) and this initial charge is heated to 155° C. under pressure (1.5 bar). Thereafter, over a period of 4.75 hours, an initiator solution (3.5 parts by weight of tertiary butylperoxy-2-ethylhexanoate (TBPEH) in 1.4 parts by weight of solvent naphtha 160/180) is metered in at a uniform rate with stirring. The monomer mixture containing 6.2 parts by weight of styrene (St), 6.2 parts by weight of methyl methacrylate (MMA), 15.5 parts by weight of 2-ethyl hexyl acrylate (EHA), 30.9 parts by weight of glycidyl methacrylate (GMA) and 0.8 parts by weight of solvent naphtha 160/180 (SN) is metered in at a uniform rate with stirring over a period of 4 hours. Afterwards, the reaction mixture is cooled to 60° C. and diluted by the addition of 11.2 parts by weight of solvent naphtha 160/180 (SN). The solid content of the resulting solution of polyacrylate is 64.5%. The resulting polyacrylate possesses a weight-average molecular weight ($M_W$) of 28300 g/mol and an epoxy equivalent weight (EEW) of 378.

Preparation of Epoxy-Functional Alkoxysilane Polymer

A reactor is charged with 16.6 parts by weight of solvent naphtha 160/180 (SN) and this initial charge is heated to 145° C. The reactor is placed under pressure (3.5 bar). Thereafter, over a period of 5 hours, an initiator solution (3.6 parts by weight of di-tert-butyl peroxide (DTBP) in 3.0 parts by weight solvent naphtha 160/180 (SN)) is metered in at a uniform rate with stirring. After 15 min of start of initiator feed, 25.6 parts by weight of vinyl trimethoxysilane (VTMS) is metered in at a uniform rate with stirring over a period of 1 hour. Simultaneously, a monomer mixture consisting of 4.9 parts by weight of methyl methacrylate (MMA), 12.2 parts by weight of n-butyl acrylate (nBA), 4.9 parts by weight of styrene (St), 24.5 parts by weight of glycidyl methacrylate (GMA) and 2.5 parts by weight of n-dodecane thiol (nDT) is simultaneously metered in at a uniform rate with stirring over a period of 4.5 hours. Following complete addition of the initiator solution, the reactor is heated to 155° C. and stirring is continued for 0.75 hours at the stated pressure, before a solution consisting of 1.2 parts by weight of di-tert-butyl peroxide (DTBP) in 1.0 parts by weight of solvent naphtha 160/180 (SN) is again added at a uniform rate over the course of 1.2 hours. Subsequently, the batch is held at the stated temperature and stated pressure for further 1.1 hours. The solid content of the resulting solution of polyacrylate is 74.8%. The copolymer possesses a number-average molecular ($M_N$) weight of 1350 g/mol and a weight-average molecular weight (Mw) of 4760 g/mol. The epoxy equivalent weight (EEW) of the copolymer is 539.

Resin Characterization

The skilled person is aware of methods for determining the acid value, OH value, epoxy equivalent weight, solid content as well as number-average and weight-average molecular weights. They are determined in accordance with the standards described hereinafter:

The acid value is determined in accordance with DIN EN ISO 2114 (date: June 2002).

The OH value is determined in accordance with DIN 53240-2 (date: November 2007).

The epoxy equivalent weight is determined in accordance with DIN EN ISO 3001 (date: November 1999). The solid content was determined in accordance with DIN EN ISO 3251 (date: June 2008). The number-average and weight-average molecular weights are determined in accordance with DIN 55672-1 (date: August 2007).

Preparation of 2K Clearcoat Composition

According to the amount in Table 1, mix resin having carboxylic acid groups, catalyst, solvent and resin having hydroxyl functional groups and additives of leveling agent, defoamer, rheology modifier to obtain Component I; mix epoxy-functional alkoxysilane or its oligomer or polymer, alkylated melamine or melamine resin and optionally epoxy resin to obtain Component II. Examples 1-6 are obtained 2K clearcoat compositions.

Preparation of Dried and Cured Film

Mix Component I and Component II of each composition of Examples 1-6 and stir the mixture evenly; spray the mixture onto steel plates and bake for 20 minutes at 140° C. The dried and cured films of Examples 1-6 are obtained as Examples #1-#6. The performance tests of Examples #1-#6 are list in Table 2.

Solid Content

Solid contents of the 2K clearcoat examples listed in Table 1 was calculated based on the solid content of individual components in component I and component II.

Performance Tests on Clearcoat (1) Appearance

The appearance of dried and cured clearcoat is evaluated by its surface texture, which is measured by BYK wave-scan dual. Surface texture is a mixture of various textures, ranging from very fine to very course. BYK wave-scan dual measures the surface textures at different scale levels, which is differentiated to six categories, identified by wavelength (Du, Wa, Wb, Wc, Wd, We) and can be visualized in a graph as shown in FIG. 1. Based on these measured data, Du, Lw, Sw are calculated by the equipment and denotes the appearance level of the pain. A lower Du, Lw, Sw value represents a better performance in appearance. Usually a good appearance performance is defined by Lw<5 and Sw<20 at the same time.

(2) Scratch Resistance

Scratch Resistance is evaluated by 20° gloss retention after dry scratch. Dry scratch was created by a crockmeter equipped with PERSI abrasive paper (grain size: 10 micron). During the test, 15 back/forth repeats were performed. 20° gloss before and after dry scratch was compared. A higher gloss retention represents a better performance in scratch resistance. The 20° gloss retention of conventional polyurethane 2K clearcoat is about 40% measured by the method described in last paragraph.

Example 1 and Example 2 are applied on black basecoat, while Example 3-6 are applied on white basecoat. Different basecoats contain different pigment/binder ratio which affects the surface roughness of basecoat, which can affect appearance in turn.

Therefore, from Example 1-6, it can be clearly seen that the invented technical approach can deliver high solid content, good appearance and better scratch resistance if compared to conventional 2K polyurethane clearcoat.

TABLE 1

| Example | | | 1 | 2 | 3 | 4 | 5 | 6 |
|---|---|---|---|---|---|---|---|---|
| Component I | Resin having carboxylic acid groups | *Carboxylic Acid Functionalized Polyester | 63.40 g | 53.00 g | 53.00 g | 30.30 g | 10.00 g | 39.21 g |
| | Resin having hydroxyl functional groups | **Hydroxyl Functionalized Polyacrylate | 9.91 g | 11.60 g | 11.60 g | 38.57 g | / | / |
| | | ***Hydroxyl Functionalized Polyester | / | 7.08 g | 7.08 g | / | / | / |
| | | Setalux 91756 VS-60 YA (from Allnex) | 14.04 g | / | / | 10.95 g | 16.78 g | 36.66 g |
| | | Setalux 81753-SS-55 (from Allnex) | / | 10.00 g | 10.00 g | / | / | / |
| | | Boltorn H330 (from Perstorp) | / | / | / | / | 37.48 g | / |
| | Catalyst | Phenyl Acid Phosphate | / | 3.00 g | 3.00 g | 0.95 g | 0.38 g | 0.83 g |
| | | Nacure 4575 (from King Industry) | 4.72 g | / | / | 1.41 g | 1.41 g | 0.42 g |
| | | Nacure 2500 (from King Industry) | 3.21 g | / | / | / | / | / |
| | Solvent | Butyl Acetate | 4.72 g | 8.60 g | 8.60 g | 13.54 g | 20.53 g | 13.67 g |
| | | Xylene | / | 5.73 g | 5.73 g | / | / | / |
| | | Butyl Glycol acetate | / | / | / | / | / | 6.25 g |
| | | Solvent naphtha 160/180 | / | / | / | / | / | 4.17 g |
| | | n-butanol | | | | | | |
| | Additive | BYK 325 (from BYK Chemie) | / | 0.20 g | 0.20 g | / | 0.20 g | 0.42 g |
| | | BYK 392 (from BYK Chemie) | / | 0.30 g | 0.30 g | 0.30 g | 0.30 g | / |
| | | BYK077 (from BYK Chemie) | / | / | / | / | / | 0.05 g |
| | | Flowlen AC 220F (from Kyoeisha Chemical) | / | 0.49 g | 0.49 g | 0.49 g | 0.49 g | / |
| | | Tinuvin 400 (from BASF) | / | / | / | 1.6 2g | 1.62 g | / |
| | | Tinuvin 292 (from BASF) | / | / | / | 1.37 g | 1.37 g | / |
| Component II | Epoxy-functional alkoxysilane and/or its oligomer/polymer | 3-Glycidoxypropyltrimethoxysilane | 48.78 g | 23.44 g | 23.44 g | 15.33 g | 18.40 g | 14.18 g |
| | | Epoxy-Functional Alkoxysilane Polymer | / | / | / | / | / | 34.26 g |
| | Epoxy Resin | Epoxide Functionalized Polyacrylate | / | 11.50 g | 11.50 g | / | / | / |
| | Amino resin | Luwipal 018 BX (from BASF) | 8.20 g | 14.23 g | 14.23 g | / | / | / |
| | | Luwipal 018 (from BASF) | / | / | / | 26.00 g | 27.24 g | 21.82 g |
| Solid Content (Component I + Component II) | | | 69% | 61% | 61% | 60% | 61% | 60% |

*the weight includes polymer, solvent etc. and the solid content is 62%
**the weight includes polymer, solvent etc. and the solid content is 58%
***the weight includes polymer, solvent etc. and the solid content is 60%

TABLE 2

| Example | #1 | #2 | #3 | #4 | #5 | #6 |
|---|---|---|---|---|---|---|
| 20° Gloss Retention | 87% | 61% | 70% | 65% | 60% | 75% |
| Lw | 2.3 | 2.6 | 1.1 | 2.8 | 2.2 | 2.8 |
| Sw | 10.5 | 16.7 | 7.8 | 11.1 | 15.2 | 12.3 |

The invention claimed is:

1. A 2K clearcoat composition comprising a component I and a component II:
   said component I comprising a), b), c) and d):
   a) at least one resin having carboxylic acid groups with an acid value of 50 to 400 mg KOH/g,
   b) at least one resin having hydroxyl functional groups with a hydroxyl value of 10 to 800 mg KOH/g,
   c) at least one catalyst, and
   d) at least one solvent; and
   said component II comprising e) and f):
   e) at least one of e1) an epoxy-functional alkoxysilane of formula I, e2) an epoxy-functional alkoxysilane of formula II, e3) a copolymer formed from the epoxy-functional alkoxysilane of formula I, and e4) a copolymer formed from the epoxy-functional alkoxysilane of formula II; and
   f) at least one crosslinker reactive to hydroxyl groups;
   wherein copolymers e3) and e4) have at least one backbone selected from the group consisting of poly(meth) acrylate, polyester, polyurethane, polyether and polyolefin, and wherein copolymers e3) and e4) have at least two epoxy groups present as end groups and/or side groups and at least two alkoxysilane groups present as end groups and/or side groups:

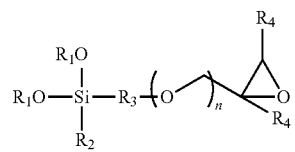

Formula I

-continued

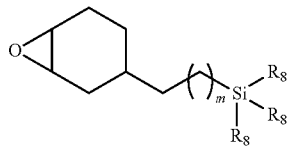

Formula II wherein $R_1$ is independently a hydrogen or alkyl group having C1-C6, $R_2$ is a hydroxy or alkyl group having C1-C6 or alkoxy group having C1-C6, $R_3$ is at least one selected from the group consisting of alkylene, cycloalkylene, heterocyclic, arylene, alkoxylene, aralkylene, alkenylene, cycloalkylene and polymer moiety, $R_4$ is independently a hydrogen or alkyl group having C1-C6, $R_8$ is independently a hydrogen or alkoxyl group having C1-C6 and at least one is alkoxyl group, n is an integer number 0 or 1 and m is an integer number from 0 to 5.

2. The 2K clearcoat composition according to claim 1, wherein said at least one resin having carboxyl acid groups with acid value of from 50 to 400 mg KOH/g is at least one selected from the group consisting of carboxylic acid functional polyester, poly(meth) acrylate, and poly(meth)acrylate-based copolymer.

3. The 2K clearcoat composition according to claim 2, wherein said carboxylic acid functional polyester has an acid value of 70 to 300 mg KOH/g.

4. The 2K clearcoat composition according to claim 2, wherein said carboxylic acid functional polyester has a weight average molecular weight of 500 to 50000 g/mol.

5. The 2K clearcoat composition according to claim 2, wherein said poly(meth)acrylate-based copolymer has an acid value of 70 to 300 mg KOH/g and a hydroxyl value of 0 to 150 mg KOH/g.

6. The 2K clearcoat composition according to claim 2, wherein said poly(meth)acrylate-based copolymer has a weight average molecular weight of 1000 to 50000 g/mol.

7. The 2K clearcoat composition according to claim 2, wherein said poly(meth)acrylate-based copolymer is at least one graft polymer comprising a backbone having a weight average molecular weight of 1000 to 40000 g/mol and a graft part having a weight average molecular weight of 250 to 60000 g/mol.

8. The 2K clearcoat composition according to claim 7, wherein said poly(meth)acrylate-based copolymer is at least one graft polymer comprising a backbone having an acid value of 0 to 200 mg KOH/g and a hydroxyl value of 25 to 200 mg KOH/g, and a graft part having an acid value of 50 to 400 mg KOH/g and a hydroxyl value of 0 to 150 mg KOH/g.

9. The 2K clearcoat composition according to claim 1, wherein said at least one resin having hydroxyl functional groups has a hydroxyl value of 60 to 500 mg KOH/g.

10. The 2K clearcoat composition according to claim 1, wherein said at least one resin having hydroxyl functional groups is at least one selected from the group consisting of hydroxyl functional polyacrylate, hydroxyl functional polyester, polyacrylic polyol, and hydroxyl functional polyurethane.

11. The 2K clearcoat composition according to claim 1, wherein said copolymers e3) and e4) have an epoxy equivalent of from 250 to 25,000 and an alkoxysilane equivalent of from 250 to 25,000.

12. The 2K clearcoat composition according to claim 1, wherein said copolymers e3) and e4) have a weight average molecular weight of from 2000 to 50000 g/mol.

13. The 2K clearcoat composition according to claim 1, wherein said at least one crosslinker reactive to hydroxyl groups comprises at least one selected from the group consisting of amino resin, alkylated melamine and free (poly) isocyanate.

14. The 2K clearcoat composition according to claim 13, wherein said amino resin comprises at least one melamine resin having a structure of Formula IV:

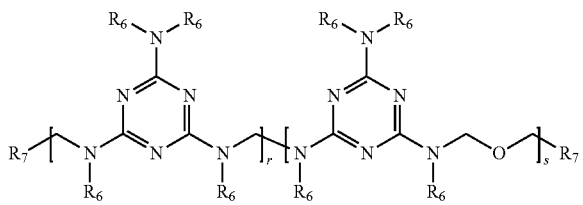

Formula IV wherein $R_6$ is independently a hydrogen, alkylol or alkoxy group having C1-C12, $R_7$ is independently an alkoxy group having C1-C12, and r, s are integer numbers from 1 to 100.

15. The 2K clearcoat composition according to claim 13, wherein said alkylated melamine has a structure of Formula V:

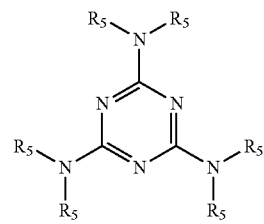

Formula V wherein $R_5$ is independently a hydrogen, alkylol or alkoxy group having C1 to C12.

16. The 2K clearcoat composition according to claim 1, wherein said at least one catalyst is at least one selected from the group consisting of monofunctional, difunctional, trifunctional and tetrafunctional carboxylic acid, organic phosphoric acid, organic sulfonic acid, quandary amine, tin-based catalyst, tertiary amine-based catalyst, adipic acid, citric acid, p-toluenesulfonic acid (PTSA), dodecyl benzene sulfonic acid (DDBSA), dinoyl naphthalene disulfonic acid (DNNDSA), dinoylnaphthalene sulfonic acid (DNNSA), Dibutyltin dilaurate (DBTDL), dioctyltin dilaurate (DOTL), 1,8-diazabicyclo[5,4,0]undec-7-ene (DBU), dimethyldodecylamine and tetrabutylammonium bromide.

17. The 2K clearcoat composition according to claim 1, wherein said at least one solvent is at least one selected from the group consisting of alcohol, esters, ethers, ketones, aromatic compounds and hydrocarbons.

18. The 2K clearcoat composition according to claim 1, wherein said component I or II further comprises at least one blocked (poly) isocyanate.

19. The 2K clearcoat composition according to claim 1, wherein said component II further comprises at least one epoxy functional resin selected from the group consisting of epoxy functional acrylate copolymer, epoxy functional polyurethane, epoxy functional polyester, epoxy functional polyethylene, epoxy functional polypropylene, bisphenol-A based epoxy resin, bisphenol-F based epoxy resin, novolac epoxy resin, siloxane epoxy resin, glycidylamine epoxy resin, aliphatic epoxy resin and cycloaliphatic epoxy resin.

20. The 2K clearcoat composition according to claim 1, wherein the weight ratio of component I and component II is from 1 to 5.

21. A substrate coated with the dried and cured 2K clearcoat composition according to claim 1.

22. An automotive material comprising the coated substrate according to claim 21.

23. A process of coating a substrate, the process comprising steps of
   i) applying an E-coating to a substrate,
   ii) applying a primer or basecoat with primer function onto the E-coating,
   iii) applying a basecoat onto the primer or basecoat with primer function, and
   iv) applying the 2K clearcoat composition according to claim 1 onto the basecoat,
   wherein the resulting coated substrate is suitable as an automotive material.

* * * * *